| United States Patent [19] | [11] | 4,381,356 |
|---|---|---|
| Marsh | [45] | Apr. 26, 1983 |

[54] STABILIZED POLYPROPYLENE COMPOSITIONS

[75] Inventor: Harold P. Marsh, Kingsport, Tenn.

[73] Assignee: Eastman Kodak Company, Rochester, N.Y.

[21] Appl. No.: 390,491

[22] Filed: Jun. 21, 1982

[51] Int. Cl.³ .............................................. C08L 23/12
[52] U.S. Cl. .................................. 523/521; 524/451; 524/513; 525/173
[58] Field of Search ................ 523/521; 524/451, 513; 525/173

[56] References Cited

U.S. PATENT DOCUMENTS

| 3,223,752 | 12/1965 | Tate | 525/172 |
|---|---|---|---|
| 3,431,322 | 4/1969 | Caldwell | 525/173 |
| 3,457,216 | 7/1969 | Dew | 524/451 |
| 4,046,837 | 9/1977 | Carroll | 525/177 |
| 4,341,690 | 7/1982 | Marsh | 524/451 |

Primary Examiner—Allan Lieberman
Assistant Examiner—Patricia Short
Attorney, Agent, or Firm—John F. Stevens; Daniel B. Reece, III

[57] ABSTRACT

Disclosed are plastic grade polypropylene compositions suitable for molding and extrusion, which contain an inert particulate filler material such as talc and a copolyester which greatly increases the heat stability of articles produced therefrom. The polypropylene is semicrystalline, isotactic, having a density equal to or greater than 0.90. The copolyesters used in the composition of this invention are described as amorphous polyesters derived at least in part from terephthalic acid and diethylene glycol or 1,4-cyclohexanedimethanol.

4 Claims, No Drawings

STABILIZED POLYPROPYLENE COMPOSITIONS

DESCRIPTION

TECHNICAL FIELD

This invention relates to compositions of plastic grade, semi-crystalline, polypropylene containing an inert filler material, and having improved heat stability.

BACKGROUND ART

In the past, it has been conventional practice to include in molding and extrusion grade polypropylene various additives which give heat stability to the polymer. Normally, about 0.5% by weight of the additives is used. The additives include antioxidants such as dilaurylthiodipropionate, Irganox 1010 (tetrakis[methylene(3,5-di-tert-butyl-4-hydroxyhydrocinnamate)methane]), and Naugard PHR (tris-[mixed mono- and dinonylphenyl phosphite), sometimes in a mixture. It has now been found that the quantity of such antioxidants may be reduced by 50% or more, by the incorporation into the polypropylene, of a small amount of a less expensive copolyester.

My copending U.S. patent application Ser. No. 202,403 filed Oct. 31, 1980, Pat. No. 4,341,690, relates to stabilized polypropylene compositions containing talc and a semi-crystalline, low glass transition temperature copolyester derived from terephthalic acid and 1,6-hexanediol.

DISCLOSURE OF THE INVENTION

The present invention provides a composition comprising polypropylene, about 10–60% by weight (preferably about 20–40%) based on the weight of polypropylene, of talc, and about 0.5–3.0% by weight (preferably about 1–2%) based on the weight of polypropylene of a copolyester derived from at least 50 mole percent terephthalic acid or dimethyl terephthalate and at least 50 mole percent ethylene glycol and about 20–50 mole percent diethylene glycol or 1,4-cyclohexanedimethanol, the copolyester having a glass transition temperature (Tg) of about 40°–85° C. and an inherent viscosity (I.V.) of about 0.2–10.

According to the present invention, there is provided a plastic grade polypropylene composition suitable for molding and extrusion, which contains an inert particulate filler material such as talc and a copolyester which greatly increases the heat stability of articles produced therefrom.

The polypropylene useful in the present invention may be described as semi-crystalline, isotactic, having a density equal to or greater than 0.90, preferably about 0.902 to 0.920, as measured on a conventional density gradient tube. The polypropylene may be further described as having a Flow Rate of about 0.1 to about 24.0, preferably about 0.5 to about 12. Flow Rate is measured at 230° C. using a weight of 2.16 kg in accordance with ASTM D-1238. Many such polypropylenes are commercially available.

The copolyester used in the compositions of this invention are described as amorphous polyesters of acid moieties and dihydric alcohol moieties. At least 50 mole percent of the acid moieties are terephthalic acid moieties. The polyester contains as moieties of the dihydric alcohol at least 50 mole percent ethylene glycol and about 20–50 mole percent diethylene glycol or 1,4-cyclohexanedimethanol.

If a minor portion (up to about 20 mole %) of the terephthalic acid moiety is replaced by a second acid moiety, it is replaced by a saturated aliphatic dicarboxylic acid having terminal carboxylic acid groups having from 4 to about 34 carbon atoms between the two carboxyl groups. Preferably, the saturated aliphatic dicarboxylic acid contains between 4 and 8 carbon atoms between the carboxyl groups. Examples of aliphatic dicarboxylic acids contemplated include adipic, azelaic or sebacic acid or mixtures thereof. Alternatively, a minor portion of the terephthalic acid content can be replaced by isophthalic acid. As a third alternative, a portion of the terephthalic acid content can be replaced by an isophthalic acid moiety or a moiety of one or more saturated aliphatic dicarboxylic acids.

The diol component of the copolyesters of the invention comprises a mixture of ethylene glycol and diethylene glycol or 1,4-cyclohexanedimethanol. A minor portion (up to about 20 mole %) of the diol component may be replaced, if desired, by conventional diols containing 3–10 carbon atoms.

With respect to the aliphatic or the named aromatic dicarboxylic acids, polyester forming derivatives can be used in the preparation of the polyester, especially the mono- or dialkyl esters of the named dicarboxylic acids, especially $C_1$–$C_4$ mono- or dialkyl esters, particularly the dimethyl esters.

Normally, the flow temperature of the preferred copolyesters will be about 150°–230° C.

The preparation of the amorphous copolyesters of the invention can be performed in a conventional manner. For example, the method of preparation can be similar to that of polyethylene terephthalate. There follows a description of a typical method for preparing the copolyester. Other techniques can be used where the terephthalic acid moiety is supplied by terephthalic acid itself rather than from an ester. In some cases, direct esterification can be employed. Those of skill in the polyester art well know the manipulative procedures whereby polyesters and copolyesters of terephthalic acid and dihydric alcohols can be employed. The manipulative procedure by which the copolyesters are prepared does not differ. Additionally, the relative amounts of these components determine the characteristics of the resultant polyester.

In an autoclave provided with a stirrer, for example, dimethylterephthalate can be esterified with a mixture of ethylene glycol and diethylene glycol or 1,4-cyclohexanedimethanol in the presence of a transesterification catalyst such as tetra n-butyltitanate and, if desired, zinc azetate dihydrate. The acid component and diol component can be used in equimolar amounts; preferably, excess amounts of the diol component are used, e.g., a diol to acid moiety mole ratio of 1.1:1.6, preferably 1.2:1.4.

At an internal temperature of about 150°–200° C., the methanol is distilled out at normal pressure. After injecting triphenylphosphite with a small amount of diol, for the purpose of inhibiting the transesterification catalyst, the autoclave is evacuated and the internal temperature is raised to 270° C. After about an hour the pressure is reduced to less than one Torr, and after an additional 3 to 4 hours of stirring, the vacuum is broken by the introduction of nitrogen, and the contents of the autoclave are removed through the bottom valve and granulated.

The melting point of the copolyesters is given as the melting maximum of the differential-thermocalorimetry (DSC-1, Perkin-Elmer, heating rate 16° C./min.).

The Tg of the polyesters useful in this invention is measured on a Differential Scanning Colorimeter, Perkin-Elmer, Model 2.

The inert filler material is preferably talc and may be present in amounts of about 10-60% by weight, based on the weight of polypropylene. The copolyester may be present in amounts of about 0.5-3.0% by weight, based on the weight of the propylene.

The polypropylene, inert filler material and copolyester may be melt compounded using conventional mixers (e.g., Banbury Mixer), followed by extrusion or rolling to transform the compound into pellets for molding or extrusion.

The following examples are submitted for a better understanding of the invention. In the examples, the polypropylene used has a density of about 0.904, and a Flow Rate of about 4. Polyester A is derived from 100 mole % terephthalic acid, 69 mole % ethylene glycol and 31 mole % 1,4-cyclohexanedimethanol. Polyesters B, C and D are derived from terephthalic acid, 63 mole % ethylene glycol and 37 mole % diethylene glycol. Other properties of the polyesters are given in the following table.

| Polyester | I.V. | Flow Rate @ 230° C. | Melting Point, °C. |
| --- | --- | --- | --- |
| A | 0.75 | 4.6 | 170 |
| B | 0.65 | 33 | 184 |
| C | 0.71 | 20. | 184 |
| D | 0.78 | 10 | 184 |

Properties of stabilized polypropylene compositions are given in the table below.

The oven life at 150° C. is checked for several 50 mil thick samples of polypropylene containing about 40% talc and copolyester as indicated. The average oven life is increased from about 120 hours (containing no polyester) to about 505-605 hours containing 2% polyester. It is apparent that incorporating the copolyester in these compositions very significantly increases the heat stability.

| Polyester | (Control) | A | B | C | D |
| --- | --- | --- | --- | --- | --- |
| Polyester, % | 0 | 2 | 2 | 2 | 2 |
| Flow Rate, g/10 min. | 8.8 | 7.5 | 7.7 | 8.0 | 8.5 |
| Specific Gravity | 1.236 | 1.260 | 1.235 | 1.258 | 1.226 |
| Deflection Temperature, 264 psi °C. | 77 | 79 | 74 | 76 | 72 |
| Tensile Strength at Fracture, psi | 4100 | 4100 | 3400 | 3350 | 3350 |
| Elongation at Fracture, % | 10 | 7 | 10 | 10 | 10 |
| Flexural Modulus of Elasticity, psi $\times 10^5$ | 4.70 | 4.80 | 5.05 | 5.02 | 5.00 |
| Notched Izod Impact Strength, at 23° C. ft.-lbs./in. of notch | 0.4 | 0.4 | 0.4 | 0.4 | 0.5 |
| Unnotched Izod Impact Strength, at 23° C. ft.-lbs./in. of width | 5.8 | 4.7 | 5.5 | 5.8 | 6.3 |
| 150° C. Oven Life, hr. 50 mil thick | 120 | 605 | 505 | 520 | 540 |
| Ash Content, % | 36.55 | 37.35 | 38.10 | 40.12 | 38.13 |
| Talc, % | 40.5 | 41.4 | 42.4 | 44.5 | 42.3 |

Since the oven life times obtained on samples containing the polyester are so much longer than really required, the more useful approach might be to reduce the level of antioxidant used. Normally, polypropylene is made using a concentrate added at a level of about 0.5%. This concentrate contains dilaurylthiodipropionate, Irganox 1010, Naugard PHR and calcium stearate as a physical blend. A series of samples is prepared using a range of levels of this concentrate. It is quite evident that reducing the level of stabilization is feasible when polyester is included in the formula. Depending on the desired level of heat stability, the concentrate level can be reduced 50% or more of conventional usage providing a cost reduction.

Whenever the term "inherent viscosity" (I.V.) is used herein, it will be understood to refer to viscosity determinations made at 25° C. using 0.5 gram of polymer per 100 ml. of a solvent composed of 60 percent phenol and 40 percent tetrachloroethane.

For purposes herein, the term "melting point" (Tm) means that temperature at which the solid and ligand phases of the material are at equilibrium at atmospheric pressure.

ASTM procedures are used for measuring the tensile strength and elongation (ASTM D1708), flexural modulus (ASTM D790), Izod impact strength (ASTM D256 Method A), and heat-deflection temperature (ASTM D648).

Oven life is described as the number of hours a sample withstands a temperature of 150° C. until failure occurs.

Unless otherwise specified, all parts, percentages, ratios, etc., are on a weight basis.

The invention has been described in detail with particular reference to preferred embodiments thereof, but it will be understood that variations and modifications can be effected within the spirit and scope of the invention.

I claim:

1. Composition comprising polypropylene, about 10-60% by weight based on the weight of polypropylene, of talc, and about 0.5-3.0% based on the weight of polypropylene of an amorphous copolyester derived from at least 50 mole percent terephthalic acid, and at least 50 mole percent ethylene glycol and about 20-50 mole percent diethylene glycol or 1,4-cyclohexanedimethanol, said copolyester characterized by having a glass transition temperature of about 40°-85° C. and an inherent viscosity of about 0.2-10.

2. Composition according to claim 1 wherein said polypropylene has a density of about 0.902 to about 0.920 and a Flow Rate of about 0.5 to about 12.

3. Composition according to claim 1 wherein said copolyester is derived from terephthalic acid, ethylene glycol, 1,4-butanediol, 1,6-hexanediol and diethylene glycol.

4. Composition according to claim 1 wherein said copolyester is derived from terephthalic acid, ethylene glycol and 1,4-cyclohexanedimethanol.

* * * * *